(No Model.)
J. M. N. JAY.
OIL CAN.
No. 423,164. Patented Mar. 11, 1890.
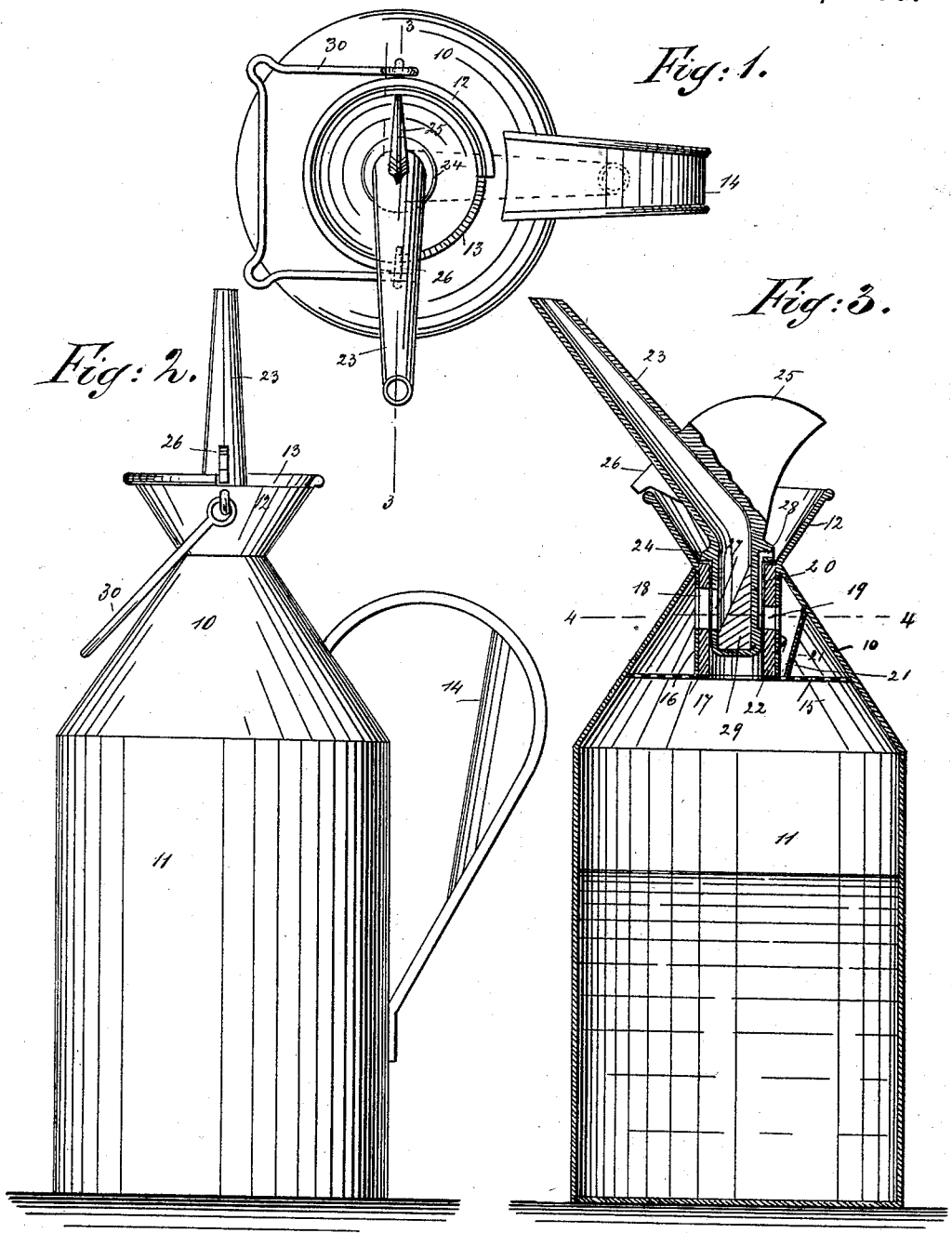
WITNESSES: 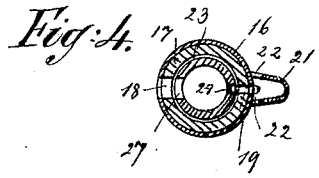 INVENTOR:

UNITED STATES PATENT OFFICE.

JEAN MARIE NAPOLEON JAY, OF NEW YORK, N. Y.

OIL-CAN.

SPECIFICATION forming part of Letters Patent No. 423,164, dated March 11, 1890.

Application filed November 15, 1889. Serial No. 330,421. (No model.)

*To all whom it may concern:*

Be it known that I, JEAN MARIE NAPOLEON JAY, of New York city, in the county and State of New York, have invented a new and useful Improvement in Oil-Cans, of which the following is a full, clear, and exact description.

My invention relates to an improvement in oil-cans or similar vessels, and has for its ob10 ject to so construct the vessel that the spout may be manipulated to permit the liquid to flow out therefrom or to cut off the supply of liquid from the spout, as desired.

A further object of the invention is to pro15 vide a means whereby any extraneous matter in the vessel with the oil will be effectually prevented from passing out of the vessel with the oil delivered from the same.

Another object of the invention is to pro20 vide a means whereby the vessel may be expeditiously and conveniently filled with the liquid and readily freed from all sediment.

The invention consists in the novel construction and combination of the several parts, as will be hereinafter fully set forth, and pointed out in the claims.

Reference is to be had to the accompanying drawings, forming a part of this specification, in which similar figures of reference indicate correspondng parts in all the views.

Figure 1 is a plan view of the vessel. Fig. 2 is a side elevation of the same. Fig. 3 is a vertical section on line 3 3 of Fig. 1, and Fig. 4 is a transverse section on line 4 4 of Fig. 3.

The vessel is ordinarily and preferably constructed with an upper conical section 10, forming a portion of the body 11, and a flaring or funnel-shaped mouth 12, secured to or constituting an integral portion of the apex of the said conical section. In the upper or peripheral edge of the funnel-section 12 a recess 13 is formed, creating two side walls adapted to limit the movement of the nozzle, as will be hereinafter set forth.

The body portion of the vessel is usually supplied with a handle 14, the same being located between the flaring mouth-section and the base, as best shown in Fig. 2. A screen or sieve 15 is horizontally secured within the coni50 cal section having a large central opening, to the walls of which opening the lower end of a vertically-disposed metal tube 16 is secured, the upper extremity of said tube being attached to the conical section 10 of the body at its union with the mouth 12, as best illustrated in Fig. 3. The tube 16 is provided with a lining 17 of cork or similar or equivalent material, and in one side of said lining and tube an outlet aperture or opening 18 is produced and a smaller vent-opening 19 in the practically diametrically-opposite walls.

The air passing through the vent-openings 19 is introduced within the body of the vessel through the medium of a passage 21, formed at the side of the tube 16, containing the vents, which passage is preferably contracted at its bottom, as illustrated in Fig. 3. This passage is ordinarily formed by attaching a plate essentially U-shaped in cross-section to the tube 16 and wall of the conical section, the lower end of the tube being projected through the sieve or screen 15.

To provide against the possibility of the air-channel becoming closed by sediment forming at the lower end thereof, one or more auxiliary openings 22 are produced in the outer wall of the said passage above the sieve. A nozzle 23 is bent to form a lower vertical section and an upper outwardly-inclined section, and the said nozzle is provided with an annular flange 24, which flange limits the thrust of the lowest section into the lined tube 16 by contacting with the upper surface of said lining, as is best illustrated in Fig. 3. The inclined section of the nozzle has formed upon one side a finger-piece 25 and upon the opposite side a stop-lug 26, which lug, as the nozzle is turned, travels upon the base wall of the recess 13 of the flaring mouth 12, as best shown in Figs. 2 and 3, and by contacting with the end walls of said recess limits the movement of the nozzle.

The lower end of the nozzle is sealed, and in one side an opening 27 is formed, capable of registry with the outlet-opening 18 of the lined tube 16, and upon the opposite side of the vertical section of the nozzle a channel 28 is produced. The channel 28 is of sufficient length to extend downward flush with the lower wall of the vent-opening 19 of the body-tube, the outlet of the said channel being located, preferably, above the flange 24.

In the bottom of the spout 23, I preferably introduce a cushion 29 of cork, and bevel the face of the cushion opposed to the inlet-opening of the said spout, as best shown in Fig. 3.

It will be observed that when the spout 23 is removed from the body a direct passage through the lined tube 16 is obtained from the flaring mouth to the interior of the vessel, whereby said vessel may be expeditiously and conveniently filled.

When the nozzle has been placed in the lined tube 16 and the stop-lug 26 placed within the recess 13 of the mouth, when said stop-lug contacts with one end wall of said recess, the inlet-opening 27 of the spout is brought in registry with the outlet-openings 18 of the tube 16, and the vent-channel 28 is made to register with the vent-opening 19. When the spout is in this position, by tipping the can in the direction of the inclination of the nozzle the liquid contents pass through the outlet-opening 18 of the body-tube through the inlet-opening 27 of the spout and out through the mouth of the latter, air being supplied through the vents 28 and 19.

It is evident from the foregoing construction that extraneous matter possible to be introduced into the body of the vessel with the oil in filling the same will be effectually prevented from entering the spout by reason of the interposed sieve or screen 15. To shut off the supply of oil, the nozzle is turned until the stop-lug 26 contacts with the opposite end wall of the recess 13, whereupon the vent-openings and the inlet-opening of the spout and outlet-opening of the body-tube are carried out of registry, and an effective seal is obtained. The vessel is usually supplied with a proper bail 30.

Having thus described my invention, I claim as new and desire to secure by Letters Patent—

1. In an oil-can or similar vessel, the combination, with the body thereof and a tube extending from the mouth into the said body, provided with a lining of a yielding material, and an outlet and a vent opening produced in opposite sides of the said tube and lining, of a screen located below the lower end of the tube extending from side to side of the body and a nozzle held to turn in contact with the lining of the tube, the said nozzle being provided with a closed bottom, an inlet-opening, and a vent-channel in its sides capable of registering, respectively, with the outlet and vent of the body-tube, substantially as and for the purpose specified.

2. In an oil-can or similar vessel, the combination, with the body thereof provided with an essentially funnel-shaped mouth having a peripheral recess produced therein, a tube extending from the mouth into the body, provided with a lining of an elastic material, the said tube and lining having produced in opposite sides an outlet and a vent opening, of a screen or sieve located horizontally within the body beneath the tube, a nozzle held to revolve within the tube in contact with its lining, having a closed bottom and provided with an outlet-opening and a vent-channel capable of registering, respectively, with the outlet and vent of the body-tube, a stop-lug secured to the tube capable of traveling in the recess of the mouth of the body, and an air-passage formed within the body at one side of the body-tube, having communication with the vent of said tube and with the space below the screen or sieve, substantially as shown and described.

JEAN MARIE NAPOLEON JAY.

Witnesses:
FRANÇOIS ANTOINE,
C. SEDGWICK.